United States Patent
Kang et al.

(10) Patent No.: US 8,395,679 B2
(45) Date of Patent: Mar. 12, 2013

(54) APPARATUS AND METHOD FOR COLOR ROLLING SUPPRESSION

(75) Inventors: Bong-hyup Kang, Changwon (KR); Moon-gi Kang, Seoul (KR); Hyun-mook Oh, Seoul (KR); Du-sic Yoo, Seoul (KR); Joon-young Chang, Seoul (KR)

(73) Assignees: Samsung Techwin Co., Ltd., Changwon (KR); Industry-Academic Cooperation Foundation, Yonsei University, Seoul (KR)

( * ) Notice: Subject to any disclaimer, the term of this patent is extended or adjusted under 35 U.S.C. 154(b) by 376 days.

(21) Appl. No.: 12/837,138

(22) Filed: Jul. 15, 2010

(65) Prior Publication Data
US 2011/0096237 A1   Apr. 28, 2011

(30) Foreign Application Priority Data
Oct. 28, 2009   (KR) .......................... 10-2009-0102717

(51) Int. Cl.
*H04N 5/235* (2006.01)
*H04N 5/228* (2006.01)
*H04N 9/73* (2006.01)
*G06K 9/00* (2006.01)

(52) U.S. Cl. ............... 348/229.1; 348/208.4; 348/225.1; 348/226.1; 348/223.1; 382/167

(58) Field of Classification Search ............... 348/223.1, 348/225.1, 226.1, 229.1, 208.1, 208.4; 382/167, 382/274
See application file for complete search history.

(56) References Cited

U.S. PATENT DOCUMENTS

| | | | |
|---|---|---|---|
| 7,596,280 B2 * | 9/2009 | Bilbrey et al. ................ | 382/274 |
| 2001/0014125 A1 * | 8/2001 | Endo ......................... | 375/240.16 |
| 2008/0291298 A1 * | 11/2008 | Kim et al. ................... | 348/241 |
| 2009/0109290 A1 * | 4/2009 | Ye et al. ...................... | 348/155 |
| 2009/0285301 A1 * | 11/2009 | Kurata ........................ | 375/240.16 |

\* cited by examiner

*Primary Examiner* — Nhan T Tran
(74) *Attorney, Agent, or Firm* — Sughrue Mion, PLLC

(57) ABSTRACT

An apparatus and method for suppressing color rolling are provided. The apparatus includes a digital signal processor which detects first motion information on a current frame and second motion information on at least one of a plurality of neighboring frames, calculates a gain based on the first and second motion information, and applies the gain to at least one channel of the current frame.

18 Claims, 8 Drawing Sheets
(2 of 8 Drawing Sheet(s) Filed in Color)

NEIGHBORING FRAME

VS.

CURRENT FRAME (NO MOTION IS DETECTED)

CURRENT FRAME (MOTION IS DETECT)

(WHEN MOTION DEOS NOT OCCUR)

(WHEN MOTION OCCURS)

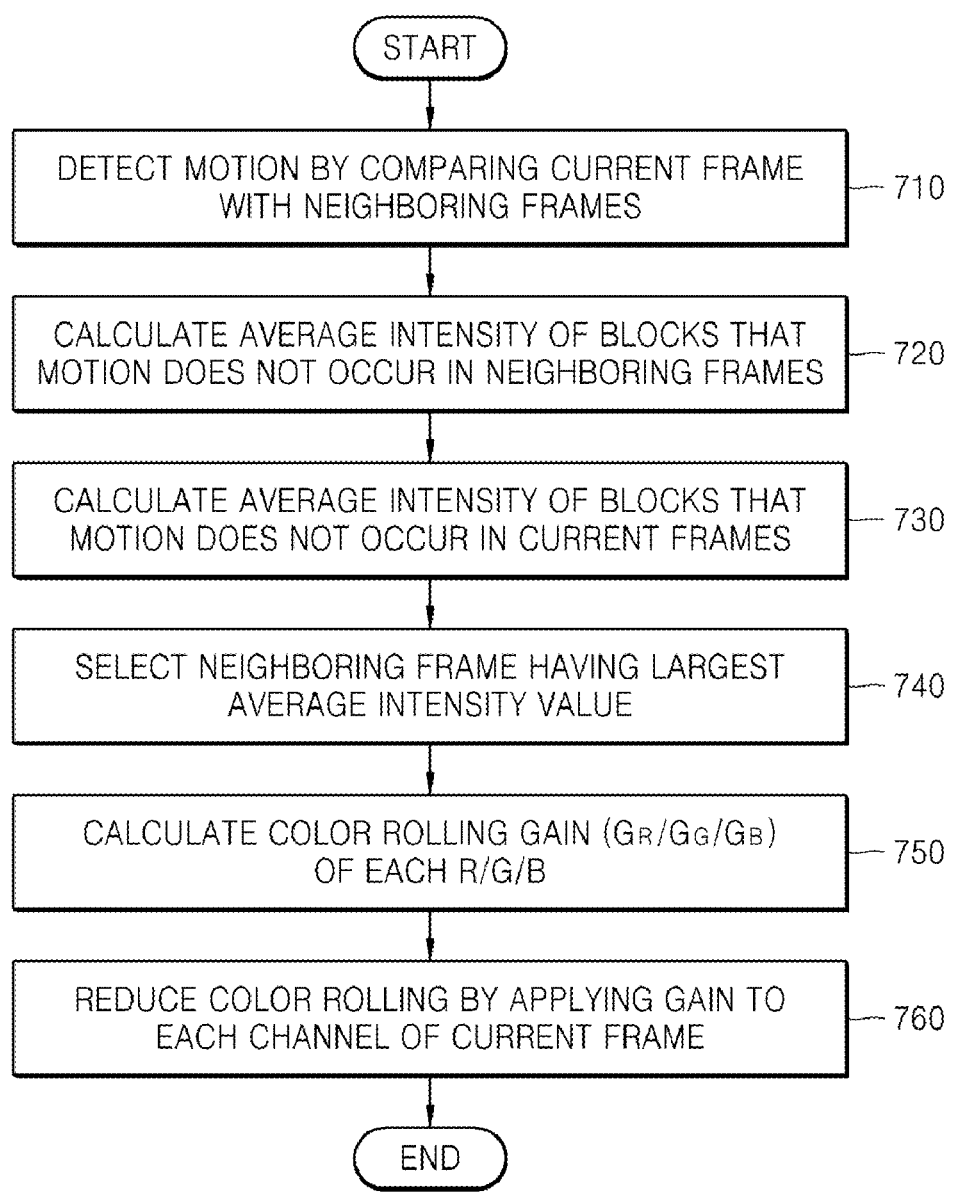

APPARATUS AND METHOD FOR COLOR ROLLING SUPPRESSION

CROSS-REFERENCE TO RELATED PATENT APPLICATION

This application claims priority from Korean Patent Application No. 10-2009-0102717, filed on Oct. 28, 2009, the disclosure of which is incorporated herein in its entirety by reference.

BACKGROUND

1. Field

Apparatuses and methods consistent with the present invention relate to processing a digital picture, and more particularly, to color rolling suppression.

2. Description of the Related Art

Color rolling means a situation in which a color temperature of a picture periodically varies when a moving picture to be stored in a National Television System Committee (NTSC) format is taken by a fixed digital picture processing device such as a closed-circuit television (CCTV). The color rolling is caused by variation of the amount of illumination input in each frame of the moving picture due to a difference between an alternating current (AC) power frequency (60 Hz) for power supply to a light source such as a fluorescent light and a sampling frequency (59.94 Hz) of the moving picture. Accordingly, as shown in FIG. 8, the moving picture alternately shows different colors such as blue and green. The occurrence of color rolling is not limited to the case of using the fluorescent light. Color rolling as described above may occur when the operation frequency of a light source is not the same as the sampling frequency of the moving picture. For example, color rolling may also occur when a light-emitting diode (LED), a semiconductor light source, etc. using alternating power is used as a light source during taking a moving picture.

Methods for reducing color rolling include a method using an automatic aperture lens and a line lock method for preventing color rolling by adjusting a sampling frequency of an image to a power frequency of a fluorescent light. However, these methods require additional costs.

Although there are signal processing methods such as a method performing auto white balance (AWB) at a high speed and a method compensating an average value of a blue (B) channel, it is difficult to expect remarkable improvement in performance from these signal processing methods. In addition, when there is a moving object, the color of an image of the moving object may be biased to a particular color.

SUMMARY

According to one or more exemplary embodiments of the present inventive concept, there is provided an apparatus and method for suppressing color rolling by acquiring motion information by comparing current frame information with neighboring frame information and compensating red (R), green (G) and blue (B) of the current frame based on the acquired motion information.

According to an exemplary embodiment, there is provided an apparatus for suppressing color rolling, including a digital signal processor which detects first motion information on a current frame and second motion information on at least one of a plurality of neighboring frames, with respect to only a portion where no motion is detected, calculates a gain based on the first and second motion information, and applies the gain to at least one channel of the current frame.

The digital signal processing block may include a motion detecting unit which detects a motion by comparing an intensity of at least one block of at least one of the neighboring frames and an intensity of at least one block of the current frame divided into a plurality of blocks; an average value calculating unit which calculates the first motion information which is a first average intensity of the current frame, with respect to at least one block where the motion is not detected in the current frame, and the second motion information which is a second average intensity of at least one of the neighboring frames with respect to corresponding at least one block therein; and a gain calculating unit which calculates the gain by dividing the second average intensity by the first average intensity; and a control unit which applies the gain to the at least one channel of the current frame.

The second average intensity may be a largest average intensity among average intensities of the neighboring frames with respect to the corresponding at least one block.

According to another exemplary embodiment, there is provided a method of suppressing color rolling, including detecting first motion information on a current frame and second motion information on at least one of a plurality of neighboring frames, with respect to only a portion where no motion is detected; calculating a gain based on the first and second motion information; and applying the gain to at least one channel of the current frame.

The detecting the motion information may include dividing the current frame and each of the neighboring frames into a plurality of blocks; detecting a motion by comparing an average intensity of at least one block of at least one of the neighboring frames and an average intensity of at least one block of the current frame divided into a plurality of blocks; and calculating the first motion information which is a first average intensity of the current frame, with respect to at least one block where the motion is not detected in the current frame, and the second motion information which is a second average intensity of at least one of the neighboring frames with respect to corresponding at least one block therein, wherein the calculating the gain value comprises calculating the gain by dividing the second average intensity by the first average intensity.

The first average intensity may be an average of an intensity of at least one block of the current frame where the motion is not detected, and the second average intensity may be an average of an intensity of at least one block of at least one of the neighboring frames corresponding to the at least one block of the current frame where the motion is not detected.

The second average intensity may be a largest average intensity among average intensities of the neighboring frames with respect to the corresponding at least one block.

BRIEF DESCRIPTION OF THE DRAWINGS

The present application contains at least one drawing executed in color. Copies of this patent or patent application publication with color drawing(s) will be provided by the Patent and Trademark Office upon request and payment of the necessary fee. The above and other aspects of the present inventive concept will become more apparent by describing in detail exemplary embodiments thereof with reference to the attached drawings, in which:

FIG. 7 is a flowchart describing an operation of a color rolling suppressing method according to an exemplary embodiment.

DETAILED DESCRIPTION OF EXEMPLARY EMBODIMENTS

The present inventive concept will now be described more fully with reference to the accompanying drawings, in which exemplary embodiments are shown. The following description and the accompanying drawings are for understanding the operations of the exemplary embodiments, and a portion that can easily be understood to those skilled in the art will be omitted.

Moreover, the specification and the accompanying drawings are not provided for the purpose of limitation, and the spirit and scope of the present inventive concept should be defined by the appended claims. In the specification, terms should be interpreted as meanings and concepts suitable for the spirit and scope of the present inventive concept in order to most appropriately express the present invention.

Hereinafter, exemplary embodiments will be described with reference to the accompanying drawings.

Figure 1:
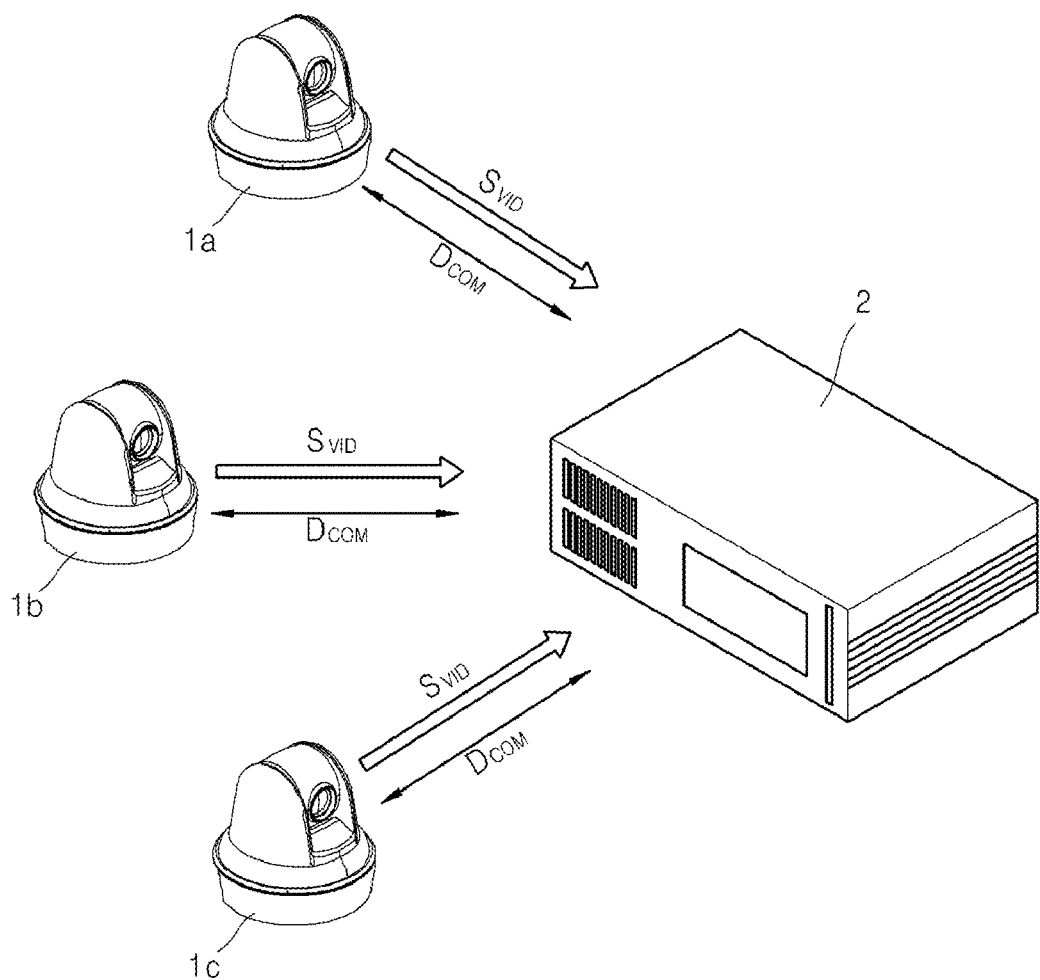
FIG. 1 is a diagram showing a monitoring system where closed-circuit televisions (CCTVs) are applied, according to an exemplary embodiment.

FIG. 1 shows a monitoring system which includes closed-circuit televisions (CCTVs) $1a$, $1b$ and $1c$, according to an exemplary embodiment. With reference to FIG. 1, each of CCTVs $1a$, $1b$ and $1c$ generates a live view picture by photographing.

Each of CCTVs $1a$, $1b$ and $1c$ transmits a live view picture to a digital video recorder (DVR) 2 through a video signal channel $S_{VID}$ while communicating with a DVR 2 as a recording device through a communication channel $D_{COM}$.

Figure 2:
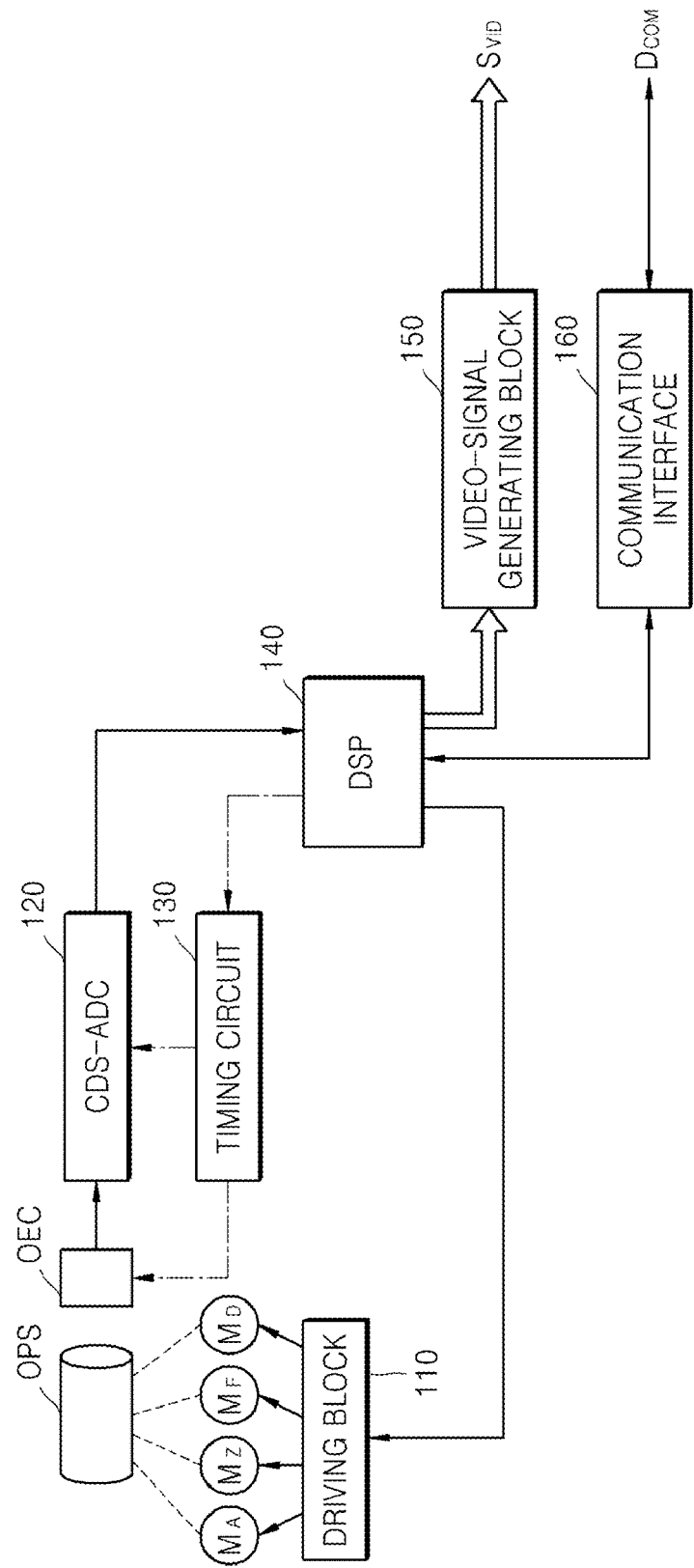
FIG. 2 is a block diagram showing an internal configuration of any one CCTV of FIG. 1, according to an exemplary embodiment.

FIG. 2 is a block diagram showing an internal configuration of any one of CCTVs $1a$, $1b$ and $1c$ of FIG. 1, according to an exemplary embodiment. With reference to FIG. 2, a CCTV includes an optical system (OPS), an optical-electrical converter (OEC), a driving block 110, a correlation double sampler and analog-to-digital converter (CDS-ADC) 120, a timing circuit 130, a digital signal processor (DSP) 140 as a control block, a video-signal generating block 150, an aperture motor ($M_A$,) a zoom motor ($M_Z$), a focus motor ($M_F$), a filter motor ($M_D$), and a communication interface 160.

The OPS including a lens block (not shown) and a filtering block (not shown) optically processes light from an object.

The lens block of the OPS includes a zoom lens (ZL) (not shown) and a focus lens (FL) (not shown). In the filtering block of the OPS, an optical low pass filter (OLPF) used at a night operation mode removes optical noise of a high-frequency content. An infrared cut filter (IRF) used at a day operation mode blocks an infrared element of incident light.

The OEC of a charge coupled device (CCD) or a complementary metal-oxide-semiconductor (CMOS) converts the light from the OPS into an electric analog signal. The digital signal processor 140 as a main controller controls operations of the OEC and the CDS-ADC 120 by controlling the timing circuit 130.

After removing high-frequency noise and controlling amplitude by processing an analog picture signal from the OEC, the CDS-ADC 120 converts the analog picture signal into digital picture data. The digital picture data are input into the DSP 140.

The DSP 140 controlling the CCTV generates digital picture data which include luminance and chromaticity signals by processing the digital signal from the CDS-ADC 120.

The video-signal generating block 150 converts the digital picture data from the DSP 140 into a video signal $S_{VID}$ as an analog picture signal.

The DSP 140 transmits the video signal from the video-signal generating block 150 to the DVR 2 through a video signal channel $S_{VID}$ while communicating with the DVR 2 of FIG. 1 as the recording device through the communication interface 160 and the communication channel $D_{COM}$ of FIG. 1.

Meanwhile, the DSP 140 drives the aperture motor ($M_A$), the zoom motor ($M_Z$), the focus motor ($M_F$), and the filter motor ($M_D$) by controlling the driving block 110. The aperture motor ($M_A$) drives an aperture (not shown), and the zoom motor ($M_Z$) drives a zoom lens (ZL). The focus motor ($M_F$) drives the focus lens (FL). The filter motor ($M_D$) drives the OLPF and the IRF in the filtering block.

Figure 3:
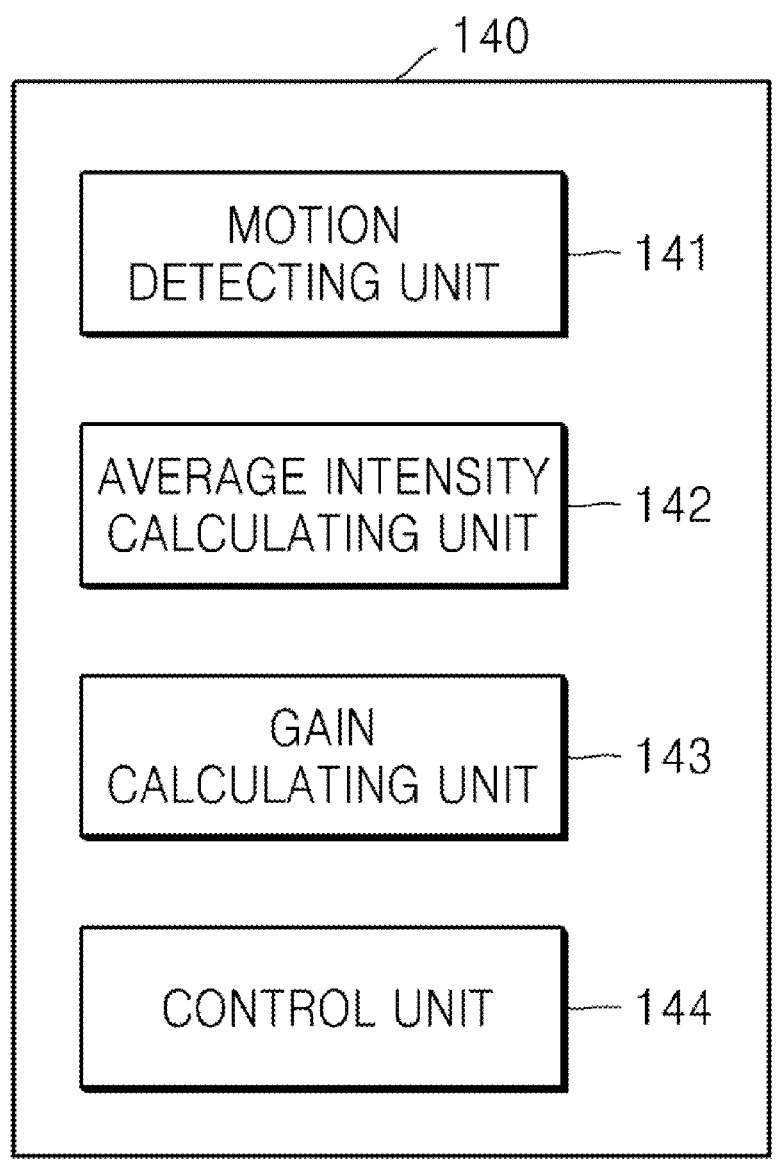
FIG. 3 is a block diagram illustrating a digital signal processing (DSP) unit for color rolling suppression in FIG. 2, according to an exemplary embodiment.

As shown in FIG. 3, the DSP 140 may include a motion detecting unit 141, an average intensity calculating unit 142, a gain calculating unit 143 and a control unit 144. Diverse modifications may be made. For example, the motion detecting unit 141, the average intensity calculating unit 142, the gain calculating unit 143 and the control unit 144 may not be constituent elements within the DSP 140 but may be separate elements not constituting the DSP 140. Their operations will be described hereinafter.

Figure 4B:
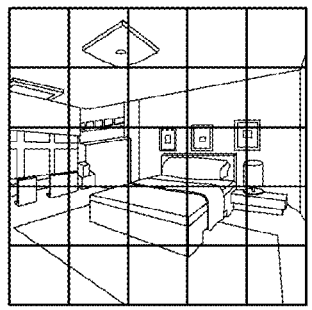
FIGS. 4A-4E illustrate motion detection by the DSP unit of FIG. 3, according to an exemplary embodiment.
Figure 4C:
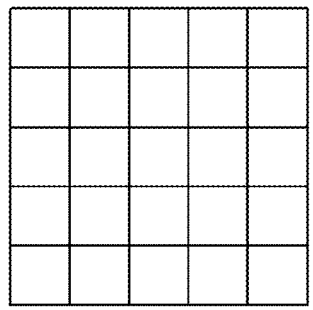
Figure 4A:
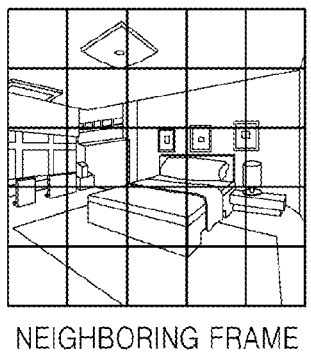
Figure 4D:
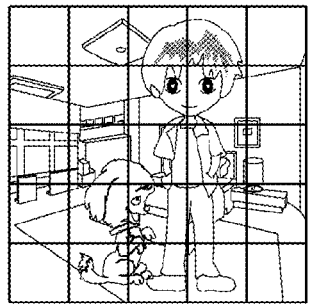
Figure 4E:
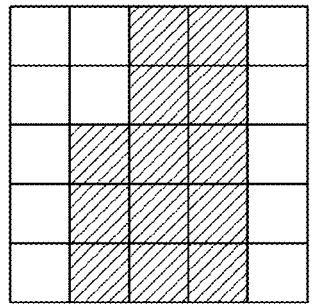
Figure 5:
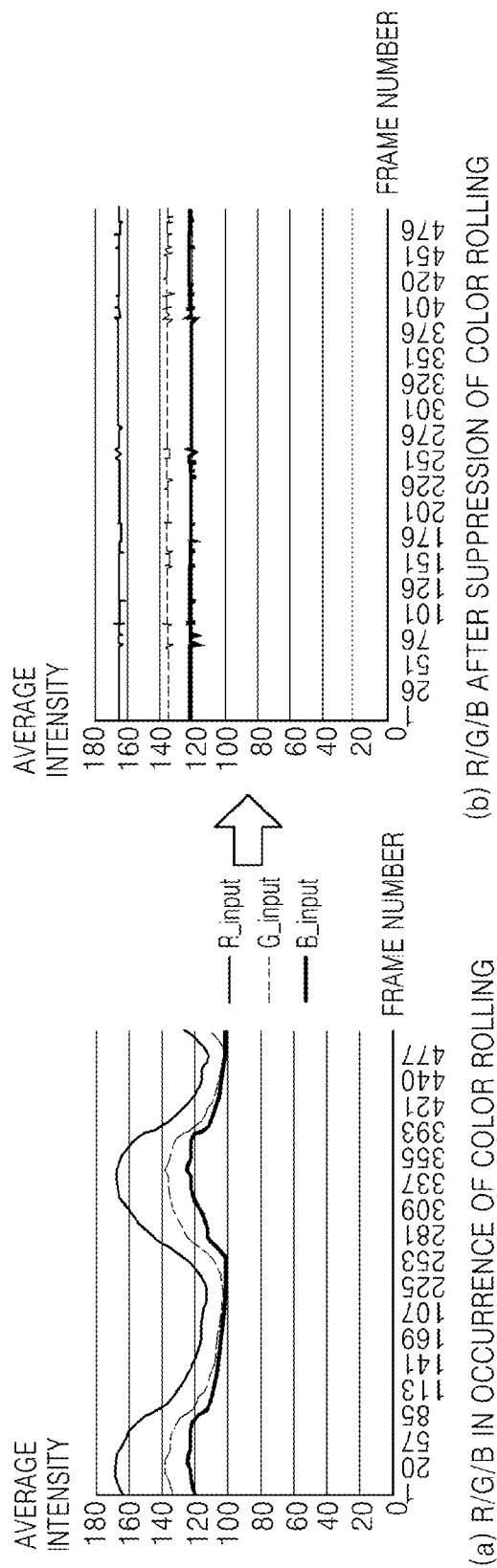
FIG. 5 illustrates intensity variations of each channel when color rolling occurs and after the color rolling has been suppressed, according to an exemplary embodiment.

With reference to FIGS. 4 to 6, functions of the DSP 140 performing color rolling suppression will be described hereinafter.

For detecting motion information by comparing a current frame with a predetermined number of previous frames, and calculating a gain value from the previous frames and the current frame in a block or blocks where the motion is not detected, thereby applying the gain value to a color or colors of the current frame, the DSP 140 uses the motion detecting unit 141, the average intensity calculating unit 142, the gain calculating unit 143 and the control unit 144. Here, instead of the previous frames, future frames or a combination of future frames and previous frames may be used to detect the motion information and calculate a gain value applied to the color or colors of the current frame.

The motion detecting unit 141 detects a motion by comparing average intensities between the blocks of the previous frames and the current frame divided into a predetermined number of blocks. The motion detecting method of the motion detecting unit 141 is performed by grasping a variation degree between neighboring frames. It is divided into global motion prediction seeking variation of an entire picture, and local motion prediction seeking a motion inside the picture. The present exemplary embodiment assumes that there is no global motion since a camera system without a motion is an object. Accordingly, a comparison method between neighboring frames is used in determining whether there is a motion in each frame. It is based on an idea that a portion having a motion may be detected when differences between two frames are compared under an assumption that stability partially exists between the neighboring frames with respect to a moving picture sequence. However, such concept may not be directly used due to an environment that there is a limitation in usage of a frame memory (not shown). Accordingly, a motion is detected and a motion map is configured by using a following method.

As shown in FIGS. 4A-4E, the motion detecting unit 141 divides a given frame into a predetermined number of blocks, e.g., 5×5 blocks, to detect a motion based on down-sampled information instead of entire frame information. Specifically, an intensity average of each block is extracted and compared. Based on a comparison result of a neighboring frame, e.g., a previous frame, of FIG. 4A and a current frame 4B with respect to an intensity average of each block, it is determined as shown in FIG. 4C that there is no motion if the compared blocks are similar in their intensities. Also, it is determined as shown in FIGS. 4D and 4E that there are motions if the compared blocks are largely different in their intensities.

An intensity average of an $m^{th}$ block in an $n-1^{th}$ frame $\overline{A}^m_{n-1}$ is defined as Equation (1) as follows.

$$\overline{A}^m_{n-1} = \sum_{(i,j) \in N_m} A_{n-1}(i, j) \qquad \text{Equation (1)}$$

In Equation (1), $N_m$ represents a set of coordinate of pixels included in the $m^{th}$ block, i and j represent coordinate values of the pixel in the set $N_m$, and $A_{n-1}$ represents an intensity of A channel element of the $n-1^{th}$ frame. Based on the description above, it is determined as shown in Equation (2) below whether there is a motion in the $m^{th}$ block.

$$Map^A_{N-1}[m]=1, |\overline{A}^m_{n-1} - \overline{A}^m_{n-2}| > \text{Threshold} \qquad \text{Equation (2)}$$

0, Otherwise

In Equation (2), $Map^A_{n-1}[m]|$ represents a motion value in the $m^{th}$ block of the $n-1^{th}$ frame, and "A" represents any one of three channels of red (R), green (G) and blue (B). In addition, "$Map_{n-1}^A[m]=1$" represents a case that there is a motion in the $m^{th}$ block, and "$Map_{n-1}^A[m]=0$" represents a case that there is no motion in the $m^{th}$ block. In other words, if it is determined that an average intensity difference between corresponding blocks of two neighboring frames is over a threshold, it is determined that there is a motion. In order to combine distributed motion information with respect to each channel, a block having a motion in any one channel as shown in Equation (3) is determined as a motion map block.

$$Map_{n-1}[m] = (Map_{n-1}^R[m] \text{ or } Map_{n-1}^G[m] \text{ or } Map_{n-1}^B[m]) \qquad \text{Equation (3)}$$

In order to combine motion information existing between the previous frames, a method as shown in Equation (4) below is adopted. That is, a block having a motion in one frame among the previous frames is determined as a motion map block.

$$Map_{n-1}[m] = (Map_{n-1}[m] \text{ or } Map_{n-2}[m] \ldots Map_{n-k}[m]) \qquad \text{Equation (4)}$$

The average intensity calculating unit 142 calculates block average intensities of corresponding blocks of the previous frames and the current frame where a motion does not occur. The average intensity calculating unit 142 uses information on the presence of the motion detected by the motion detecting unit 141 to measure the average intensities. In measuring the average intensities, a selective average intensity determination is used. That is, average intensities only with respect to the blocks where a motion is not detected may be measured. Since a color variation degree between a current frame and a previous frame is acquired not using information on blocks having a motion, but using information on blocks having no motion, a color rolling suppression gain strong to the motion is acquired. Next, an equation for acquiring an average of average intensities of blocks having no motion is described in Equation (5).

$$\overline{A}_n = \sum_{all\ m} (1 - Map_{n-1}[m]) \times \overline{A}^m_{n-1} \qquad \text{Equation (5)}$$

$$\overline{A}_t = \sum_{all\ m} (1 - Map_{n-1}[m]) \times \overline{A}^m_t$$

In Equation (5), $\overline{A}_t$ represents an average of average intensities of blocks having no motion in a previous frame and $\overline{A}_t^m$ represents an average intensity of an $m^{th}$ block of the previous frame. Thus, $\overline{A}_t$ indicates an average intensity of a frame with respect to the blocks having no motion. It will be noted again that when average intensities of a previous frame and a current frame are calculated, average intensities of corresponding blocks are used after performing sampling based on the combined motion information with respect to the channels and the frames. As described above, estimating a current frame based on information on a previous frame which is earlier than the current frame is performed as a method for operating a color rolling suppression algorithm to acquire an approximation by a minimum quantity of operations under an assumption that a remarkable amount of variations does not occur between the current frame and the previous frame.

The gain calculating unit 143 calculates a gain of each channel by using the previous frame average intensity and the current frame average intensity calculated by the average intensity calculating unit 142 as shown in Equation (6).

$$Gain_n^R = \frac{\overline{R}_t}{\overline{R}_n}, \quad Gain_n^G = \frac{\overline{G}_t}{\overline{G}_n}, \quad Gain_n^B = \frac{\overline{B}_t}{\overline{B}_n} \qquad \text{Equation (6)}$$

In equation (6), $Gain_n^A$ represents a gain to be applied to A channel element of pixels in the $n^{th}$ frame.

The control unit 144 suppresses color rolling variation and reduces variation of an intensity using the gain calculated by the gain calculating unit 143. Equation (7) shows an equation that color rolling is suppressed in each channel by using the gain.

$$\hat{R}_n(i,j) = Gain_n^R \times R_n(i,j)$$

$$\hat{G}_n(i,j) = Gain_n^G \times G_n(i,j)$$

$$\hat{B}_n(i,j) = Gain_n^B \times B_n(i,j) \qquad \text{Equation (7)}$$

In equation (7), $\hat{A}_n(i,j)$ represents a corrected intensity of A channel element of the $n^{th}$ frame.

According to an exemplary embodiment, motion prediction is important to acquire a gain for strongly and stably suppressing color rolling. In order to detect an exact motion in continuous frames without regard to motions, it is required to properly set a previous frame among a predetermined number of previous frames to be compared to a current frame. A previous frame having the largest intensity among the predetermined number of previous frames when color rolling occurs is selected for such frame to be compared to a current frame. (a) of FIG. 5 shows intensity variation of each channel when color rolling occurs, and (b) of FIG. 5 shows intensity variation of each channel after color rolling has been suppressed. As shown in FIG. 5, a previous frame having the largest intensity is selected for a previous frame in order to have the intensity close to the maximum value when color rolling is reduced.

Also, when motion information is acquired by comparing information between a current frame and neighboring frames, a previous frame may be adapted to variation of the picture by updating the previous frame with the motion information. It also has an effect that an stable operation is possible in such a case that an object comes to a center of a screen and stays for a long time.

Figure 6A:
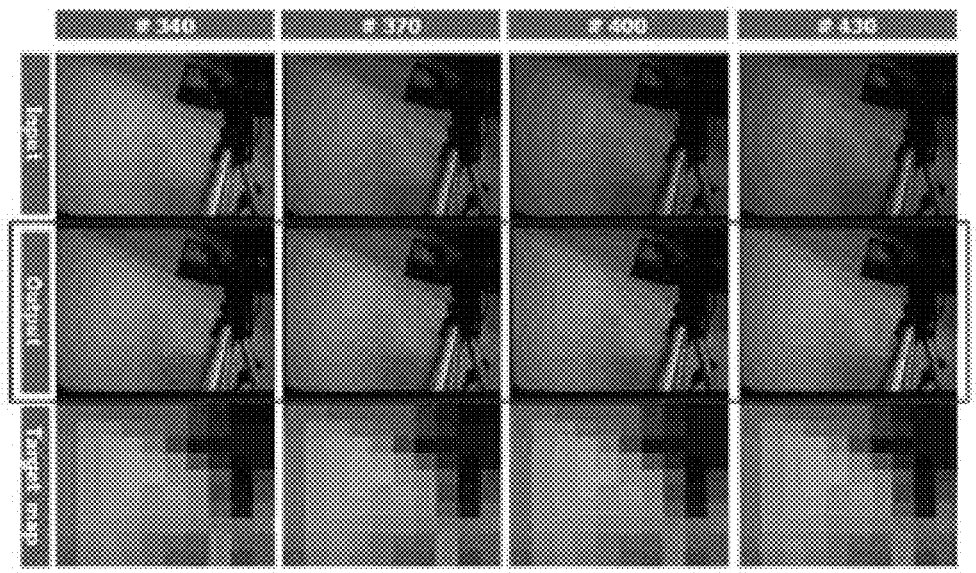
FIGS. 6A-6B show before and after suppressing color rolling and a degree of color rolling suppression when a motion does not occur and when the motion occurs.
Figure 6B:
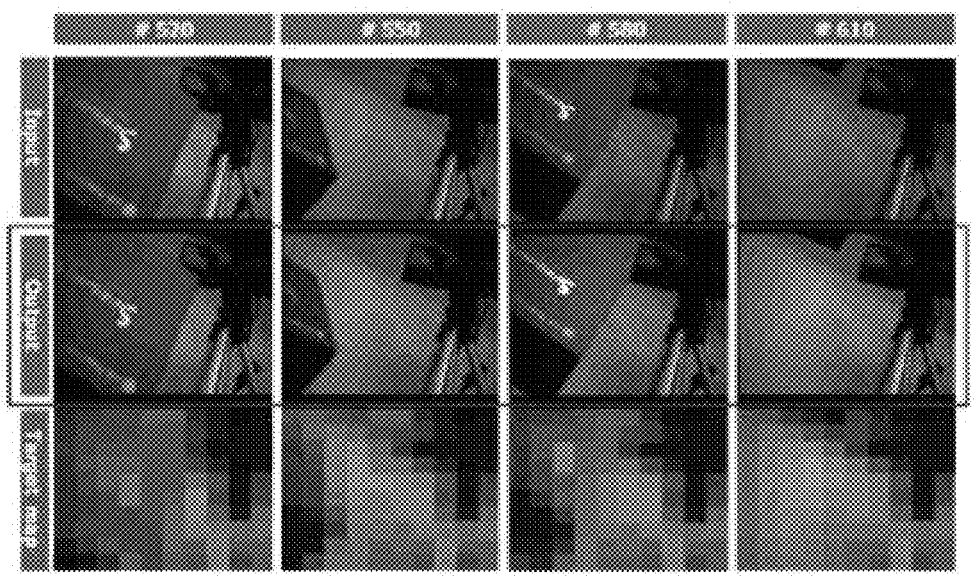
Figure 8:
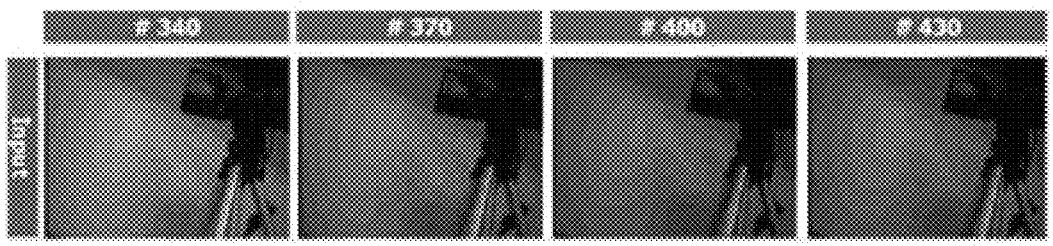
FIG. 8 is a diagram describing general color rolling which occurs in a related art.

In FIG. 6A, pictures in each row shows screen variation when color rolling occurs, screen variation after color rolling has been suppressed, and a gain compensation by each frame, respectively, when a motion does not occur between the frames. In FIG. 6B, pictures in each row shows screen variation when color rolling occurs, screen variation after color rolling has been suppressed, and a gain compensation by each frame, respectively, when a motion occurs between frames. Thus, it will be appreciated that color rolling is reduced by motion detection and gain calculation.

The color rolling suppression method according to an exemplary embodiment will be described in detail hereinafter with reference to FIG. 7. The color rolling suppression may be performed within a CCTV as shown in FIG. 2. According to an exemplary embodiment, a main algorithm of the color rolling suppression may be performed by the DSP 140 with the help of peripheral elements.

When a picture is input, the DSP 140 detects a motion by comparing a current frame with a predetermined number of previous frames in operation S710. Detailed description on the motion detection will not be provided here since it is disclosed above.

In operation S720, the DSP 140 calculates average intensities of blocks that a motion does not occur in the current frame.

In operation S730, the DSP 140 calculates average intensities of the blocks that a motion does not occur in the predetermined number of previous frames. In operation S740, a previous frame having the largest average intensity value is selected. For this operation, an average of average intensities of blocks in each frame having no motion may be obtained. Such average of average intensities of the blocks is an average intensity of a corresponding frame with respect to the blocks having no motion.

In operation S750, the DSP 140 calculates a gain by dividing the largest average intensity of the selected previous frame by the average intensity of the current frame by each channel of R, G and B.

In operation S760, when the gain is completely calculated in each channel R, G and B, the DSP 140 reduces color rolling by applying the gain to each channel of the current frame.

According to the exemplary embodiments as described above, an effect that may take a stable image without color rolling is acquired by suppressing color rolling through motion detection and color compensation.

In addition, color rolling is consistently reduced without regard to motion detection.

While the present inventive concept has been particularly shown and described with reference to the exemplary embodiments thereof, it will be understood by those skilled in the art that various changes in form and details may be made therein without departing from the spirit and scope of the present inventive concept as defined by the appended claims. The exemplary embodiments should be considered in descriptive sense only and not for purposes of limitation. Therefore, the scope of the present inventive concept is defined not by the detailed description of the exemplary embodiments but by the appended claims, and all differences within the scope will be construed as being included in the present inventive concept.

What is claimed is:

1. An apparatus for suppressing color rolling, comprising:
a digital signal processor which detects first motion information on a current frame and second motion information on at least one of a plurality of neighboring frames, calculates a gain based on the first and second motion information with respect to only a portion where no motion is detected, and applies the gain to at least one channel of the current frame,
wherein the digital signal processing block comprises:
a motion detecting unit which detects a motion by comparing an intensity of at least one block of at least one of the neighboring frames and an intensity of corresponding at least one block of the current frame divided into a plurality of blocks;
an average value calculating unit which calculates the first motion information which is a first average intensity of the current frame, with respect to at least one block where the motion is not detected in the current frame, and the second motion information which is a second average intensity of at least one of the neighboring frames with respect to corresponding at least one block therein; and
a gain calculating unit which calculates the gain by dividing the second average intensity by the first average intensity; and
a control unit which applies the gain to the at least one channel of the current frame.

2. The apparatus of claim 1, wherein the at least one channel comprises red (R), green (G) and blue (B) channels.

3. The apparatus of claim 1, wherein the plurality of neighboring frames comprise at least one frame among a plurality of previous frames and future frames.

4. The apparatus of claim 1, wherein the first motion information includes an intensity of at least one block of the current frame where no motion is detected, and the second motion information includes an intensity of at least one block of at least one of the neighboring frames corresponding to the at least one block of the current frame where no motion is detected.

5. The apparatus of claim 1, wherein the first average intensity is an average of intensities of at least one block of the current frame which does not have the motion, and the second average intensity is an average of intensities of at least one block of at least one of the neighboring frames corresponding to the at least one block of the current frame.

6. The apparatus of claim 1, wherein the plurality of neighboring frames comprise at least one frame among a plurality of previous frames and future frames.

7. The apparatus of claim 1, wherein the motion detecting unit detects the motion by determining occurrence of the motion if a difference between the intensity of at least one block of at least one of the neighboring frames and the intensity of the corresponding at least one block of the current frame is greater than a threshold value.

8. The apparatus of claim 1, wherein the second average intensity is a largest average intensity among average intensities of the neighboring frames with respect to the corresponding at least one block.

9. The apparatus of claim 8, wherein the first average intensity is an average of an intensity of at least one block of the current frame where the motion is not detected, and the second average intensity is an average of an intensity of at least one block of at least one of the neighboring frames corresponding to the at least one block of the current frame where the motion is not detected.

10. A method of suppressing color rolling, comprising:
detecting first motion information on a current frame and second motion information on at least one of a plurality of neighboring frames, with respect to only a portion where no motion is detected;
calculating a gain based on the first and second motion information; and
applying the gain to at least one channel of the current frame,
wherein the detecting the motion information comprises:
dividing the current frame and each of the neighboring frames into a plurality of blocks;
detecting a motion by comparing an average intensity of at least one block of at least one of the neighboring frames and an average intensity of at least one block of the current frame divided into a plurality of blocks; and
calculating the first motion information which is a first average intensity of the current frame, with respect to at least one block where the motion is not detected in the current frame, and the second motion information which is a second average intensity of at least one of the neighboring frames with respect to corresponding at least one block therein, and
wherein the calculating the gain value comprises calculating the gain by dividing the second average intensity by the first average intensity.

11. The method of claim 10, wherein the at least one channel comprises red (R), green (G) and blue (B) channels.

12. The method of claim 10, wherein the plurality of neighboring frames comprise at least one frame among a plurality of previous frames and future frames.

13. The method of claim 10, wherein the first motion information includes an intensity of at least one block of the current frame where no motion is detected, and the second motion information includes an intensity of at least one block of at least one of the neighboring frames corresponding to the at least one block of the current frame where no motion is detected.

14. The method of claim 10, wherein the first average intensity is an average of an intensity of at least one block of the current frame where the motion is not detected, and the second average intensity is an average of an intensity of at least one block of at least one of the neighboring frames corresponding to the at least one block of the current frame where the motion is not detected.

15. The method of claim 10, wherein the plurality of neighboring frames comprise at least one frame among a plurality of previous frames and future frames.

16. The method of claim 10, wherein the detecting the motion is performed by determining occurrence of the motion if a difference between the intensity of at least one block of at least one of the neighboring frames and the intensity of corresponding at least one block of the current frame is greater than a threshold value.

17. The method of claim 10, wherein the second average intensity is a largest average intensity among average intensities of the neighboring frames with respect to the corresponding at least one block.

18. The method of claim 17, wherein the first average intensity is an average of an intensity of at least one block of the current frame where the motion is not detected, and the second average intensity is an average of an intensity of at least one block of at least one of the neighboring frames corresponding to the at least one block of the current frame where the motion is not detected.

* * * * *